W. N. ALLAN.
AUTOMOBILE HEADLIGHT.
APPLICATION FILED SEPT. 11, 1913.
1,103,857.
Patented July 14, 1914.
2 SHEETS—SHEET 1.
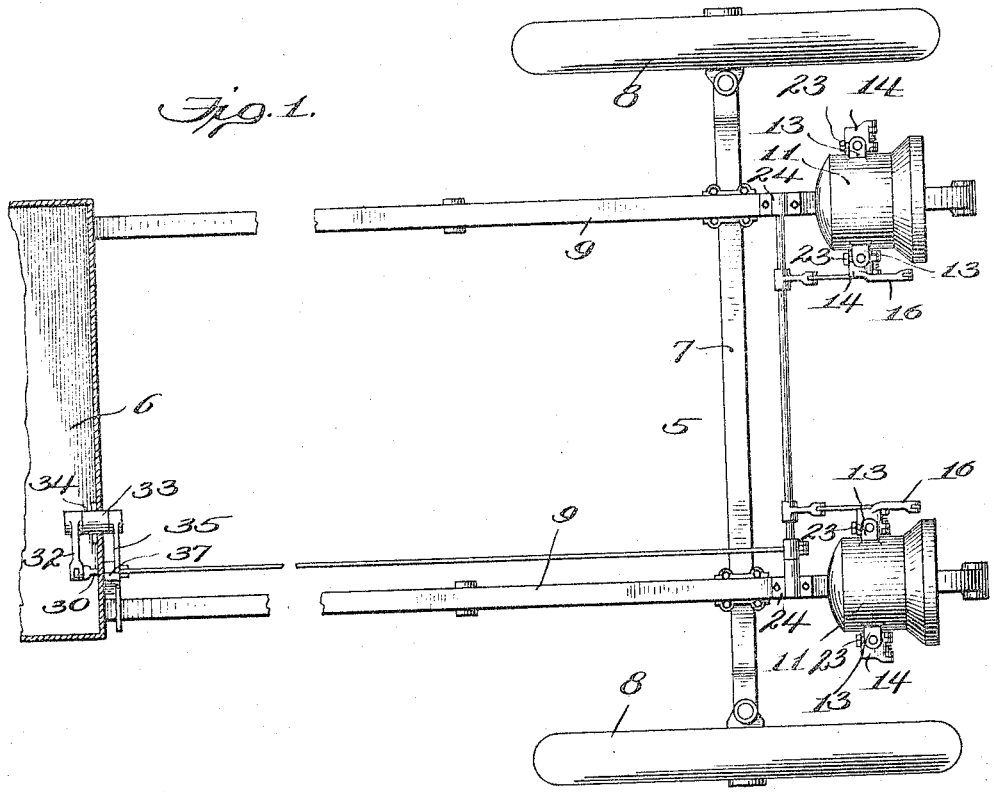
Fig. 1.
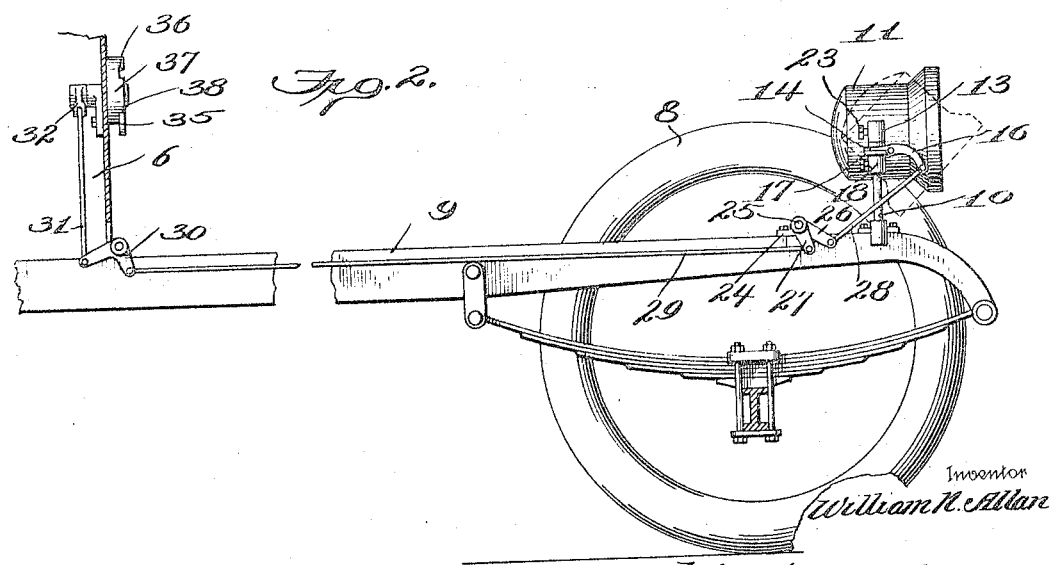
Fig. 2.
Witnesses
Inventor
William N. Allan
by
Attorney W. N. ALLAN.
AUTOMOBILE HEADLIGHT.
APPLICATION FILED SEPT. 11, 1913.
1,103,857.
Patented July 14, 1914.
2 SHEETS—SHEET 2.
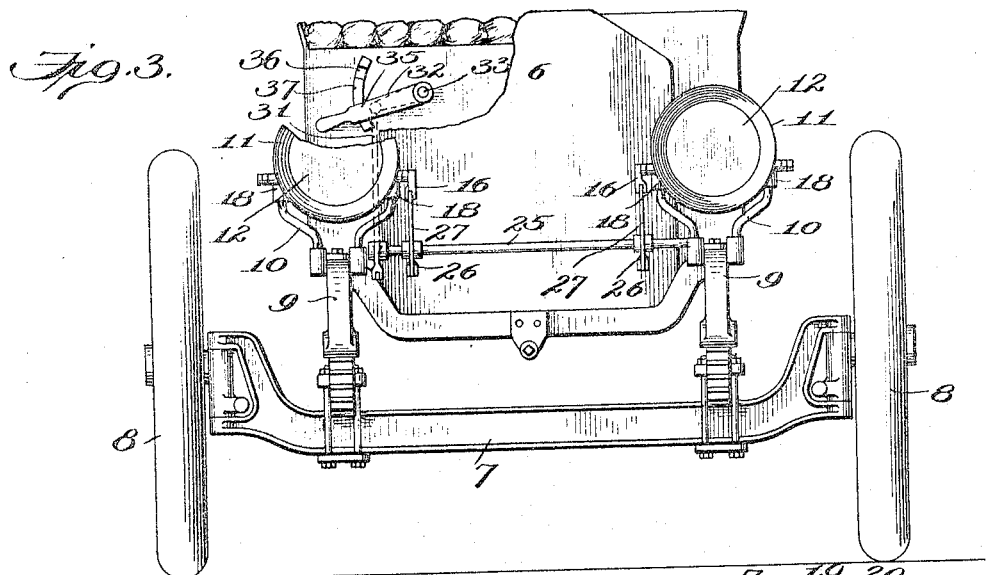
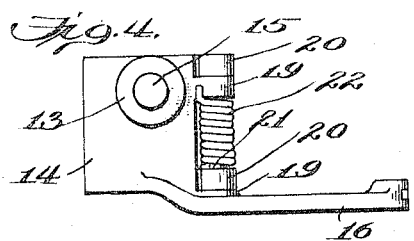
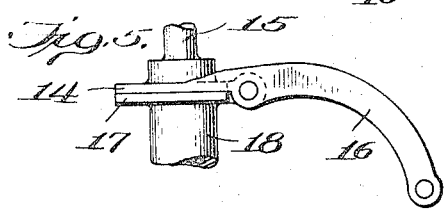
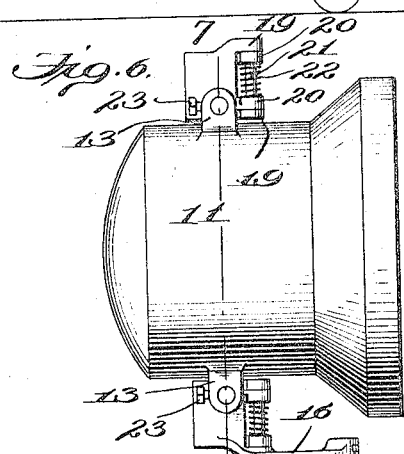
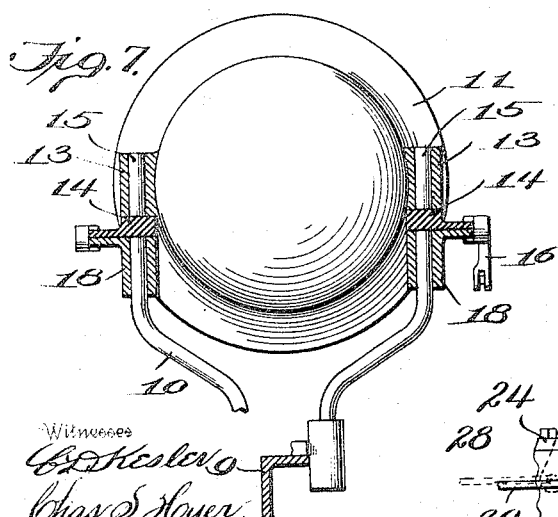
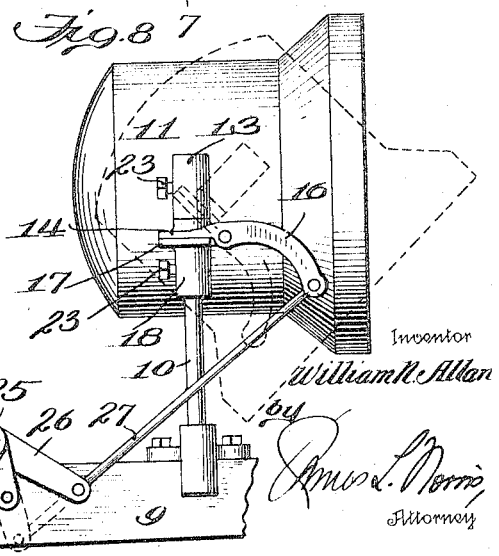
Inventor
William N. Allan
by
James L. Norris
Attorney
Witnesses

UNITED STATES PATENT OFFICE.

WILLIAM N. ALLAN, OF SAN ANTONIO, TEXAS.

AUTOMOBILE-HEADLIGHT.

1,103,857.

Specification of Letters Patent. Patented July 14, 1914.

Application filed September 11, 1913. Serial No. 789,299.

*To all whom it may concern:*

Be it known that I, WILLIAM N. ALLAN, a citizen of the United States, residing at San Antonio, in the county of Bexar and State of Texas, have invented new and useful Improvements in Automobile - Headlights, of which the following is a specification.

This invention relates to headlights or illuminating means for an automobile or other vehicle, and the primary object of the invention is to provide means for casting or projecting a light downwardly at a fixed angle slightly in advance of the front wheels of an automobile or other vehicle and to maintain the light in this angular position as long as required without manual retention to relieve the front of an automobile or other vehicle of the confusing glare of a light usually projected longitudinally or straight away and without in the least modifying the full reflecting or illuminating capacity of the lamp, and at the same time give ample view of the roadway far enough ahead to assist the driver or chauffeur in steering and preventing ditching accidents, or colliding with objects along the sides of or in the roadway by a strong guiding light; and also to provide for ready adjustment of the headlight to throw forwardly projecting rays of light in the usual manner after the angular adjustment of the light has accomplished the purpose desired.

A further object of the invention is to facilitate the application of the improved headlight to the usual lamp or headlight supporting brackets and adjacent parts of an automobile without requiring material and expensive reconstruction of the parts of an automobile and thus essentially economize in the adaptation of the improved headlight and its operating devices.

The invention consists in the construction and arrangement of the several parts which will be more fully hereinafter described and claimed in preferred form.

In the drawings:—Figure 1 is a top plan view, partially broken away and in section, of the front portion of an automobile, showing the improved headlight and operative devices applied thereto. Fig. 2 is a longitudinal section of the same automobile organization partly broken away with the improved headlight shown in full and dotted line positions. Fig. 3 is a front end elevation of the automobile organization broken away in part and illustrating the improved headlights. Figs. 4 and 5 are, respectively, a plan and side elevation of one of the hinge connections for the headlight. Fig. 6 is an enlarged top plan view of one of the headlights showing the hinges in operative positions relatively thereto together with the brackets. Fig. 7 is a section in the plane of the line 7, 7, Fig. 7, through the hinges, with the headlight in rear elevation, and also showing the bracket arms on yoke and a portion of the chassis in cross section. Fig. 8 is an enlarged side elevation of one of the headlights, the hinge on one side and bracket arm or yoke and portions of the chassis and operating mechanism, the headlight and operating parts being shown in two positions in full and dotted lines.

The numeral 5 designates the chassis, 6 the body and 7 the front beam with the usual or any approved form of front steering wheels 8 applied thereto. On the forward extremities of side members 9 of the chassis the well known upstanding divergent supporting arms or yokes 10 for the headlights 11 are suitably secured and rigidly held against movement. The headlights 11 will be constructed in accordance with the use therewith of gas, oil or electricity, and embody a front lens 12 and any preferred form of internal reflector or reflecting surface, and at diametrically opposite points each headlight has the usual vertical sockets 13 to fit on the arms or yokes 10. In the present instance devices embodying the features of the invention are in part coördinated with the sockets 13 and consists of hinge plates 14 and posts 15, one for each socket, provided with forwardly and downwardly projecting operating arms 16. The plates 14 are separably mounted on companion head plates 17 fixed on the upper ends of supplemental sockets 18. The plates 14 and 17, respectively, have forwardly projecting knuckles 19 and 20 connected by pintles 21 with springs 22, one on each pintle, operating by proper terminal engagement to manually close the said plates when the latter are released by the operating mechanism which will be hereinafter described. The sockets 13 and 18 are held in removable rigid position on the posts 15 and arms or yokes 10 by set screws 23 and may be readily adjusted as desired to accommodate the particular form of headlight that may be used, or to raise and lower the headlights as conditions may require.

In suitable bearings 24 secured on the members 9 of the chassis, a crank shaft 25 is mounted adjacent to and in rear of the arms or yokes 10 and headlights 11, said crank shaft having intermediate crank arms 26 and an end crank arm 27, and between the crank arms 26 and the operating arms 16 connecting rods 28 are interposed and attached to both sets of arms. An actuating rod 29 for the shaft 25 is attached to the crank arm 27 and extends rearwardly to and through the front portion of the body 6 where it is also attached to a suitably mounted bell-crank 30 having a connecting rod 31 secured thereto and to a crank arm 32 on a short crank shaft 33 held in a bearing bracket 34 mounted on a part of the body 6 within easy reaching distance of the driver or chauffeur. The crank shaft 33 is provided with an operating lever 35 disposed adjacent to and adapted to engage slots 36 and 37 of a segment 38 to lock the headlights 11 in normal position or at downward angles of inclination, as shown by full and dotted lines in Figs. 2 and 3. The headlights are moved against the resistance of the springs 22 which are wound or become contracted when the headlights are tilted forwardly. The headlights are uniformly tilted by the shaft 25 and the operating devices for the latter, and the crank arms 26 are so applied to said shaft that they may be shifted to accommodate various forms of headlight supporting arms or yokes, or other structural contingencies in applying the improved headlight adjusting and operating means to various automobile structures. Likewise when the sockets 18 and 23 are secured at differing elevations on the posts 15 and arms or yokes 10, the connecting rods 27 will be correspondingly lengthened or shortened.

In operating the headlights 11 to change them to reflect light at downward and forward angles of inclination, the lever 35 is pulled upwardly from the position shown by Fig. 3 and the shaft 33 is turned over to the left, thereby elevating the crank arm 32 and drawing the rod 31 in an upward direction and operating the bell crank 30 to exert a rearward pull on the rod 29. Through the medium of the crank arm 28 the crank shaft 25 is rotated in a forward direction and the crank arms are thrown downwardly. The downward movement of the crank arms 26 draws the rods 27 in the same direction and by means of the arms 16 the plates 14 are tilted upwardly and forwardly on the plates 17 and therewith the sockets 13 and headlights 11 also move in a like manner against the resistance of the springs 22 as clearly shown by Figs. 4 and 7, and the headlights may be reliably fixed at a downward angle by engaging the lever 35 with the upper slot 36 of the segment 37. When it is desired to restore the headlights to normal positions, the lever 35 is released from the slot 36 of the segment 38, and immediately the springs 22 cause the plates 14 to close against the plates 7, and the headlights will be positively held in normal position by engaging the lever 35 with the lower slot 37 of the segment 38, though the springs 22 may, under ordinary traveling vibrations be sufficient to hold the headlights against movement.

When the headlights are disposed and held at downward angles of inclination, the light will be cast on the roadway a short distance in advance of the wheels 8, and the driver or chauffeur will be able to steer and run the automobile or machine with certainty and safety and at the same time projected, glaring light in a straight line or longitudinally in front of the automobile will be obviated and accidents, such as collisions, will be averted and compliance with local laws may be fully accomplished without requiring the application of extraneous devices to the headlights or in any manner modifying the usual structure of headlights, or by requiring the driver to alight from the automobile. Moreover, the parts of the improved attachments are so constructed that they may be readily applied to any standardized automobile organization without requiring essential changes in structure, and in fact without making any changes whatever. Therefore, the improved attachments can be made and sold ready for application by anyone having but a limited knowledge of mechanics with material advantages in the economical adaptation of the improved headlight equipment or manipulating devices.

What is claimed is:

1. The combination with an automobile, of the usual fixed headlight yokes, headlights hinged to said yokes and having means connected thereto for simultaneously and equally tilting the headlights downwardly and causing them to maintain a reflected light at downward angles of inclination immediately in advance of the steering wheels of the automobile.

2. The combination with an automobile, of the usual fixed headlight yokes, headlights hinged to said yokes, means for downwardly tilting said headlight and maintaining an illumination at a downward angle of inclination slightly in advance of the front wheels of the automobile, and means for automatically restoring the headlights to normal position when released.

3. The combination with headlights and supports for the latter, of sockets for attachment to the headlights, additional sockets hinged to the sockets on the headlight sockets and removably mounted on the supports, and means for operating said headlights.

4. The combination with an automobile, of headlights provided with means for supporting and tilting the headlights and independent of and removably applied to the usual headlight supporting means for shifting the reflected light of said headlights from a straightaway projected plane to a downward angle of inclination slightly in advance of the front wheels of the automobile without modifying the illuminating capacity of the headlights, and means for maintaining the headlights in either position of reflection and controllable from the interior of the automobile.

5. The combination with an automobile, of the usual headlight supporting yokes, headlights provided with intermediately jointed sockets mounted on the yokes and permitting the headlights to be swung at downward angles of inclination, and mechanism connected to said sockets and operable from the interior of the automobile for swinging the headlights at downward angles of inclination.

6. The combination with an automobile, of the usual fixed yokes, headlights provided with jointed socket means mounted on the yokes to permit the headlights to be swung down at an inclination, mechanism attached to portions of the jointed sockets and operable from the interior of the automobile for swinging the headlights downwardly at an inclination, and means for automatically restoring the headlights to normal position when released.

7. The combination with an automobile, of the usual fixed yokes, headlights provided with jointed socket means mounted on the yokes to permit the headlights to have a downward swinging movement, mechanism attached to a portion of the sockets for imparting thereto a downward swinging movement and maintaining them at a downward inclination, and operable from the interior of the automobile, and means engaging the jointed sockets for restoring the headlights to normal position when released.

8. The combination with headlight supporting means, of supplemental sockets applied on the supporting means, headlights having sockets also fitted on said means above the supplemental sockets, the supplemental and other sockets being movably connected, and mechanism for forwardly tilting the headlight sockets on the supplemental sockets.

9. The combination with headlight supporting means, of supplemental sockets applied on the supporting means, headlights having sockets also fitted on said means above the supplemental sockets, the supplemental and other sockets being movably connected, and mechanism for forwardly tilting the headlight sockets on the supplemental sockets, and means for restoring the parts to normal position when the headlight sockets and headlights are released.

10. The combination with the usual headlight yokes and headlights, of jointed sockets removably fitted on the yokes, and mechanism attached to the headlights for simultaneously and equally deflecting them at downward angles of inclination.

11. The combination with the usual headlight yokes and headlights, of jointed sockets removably fitted on the yokes, and mechanism attached to the headlights for simultaneously and equally deflecting them at downward angles of inclination or for similarly restoring them to normal positions.

12. The combination with the usual headlight yokes and headlights, of jointed sockets removably fitted on the yokes, and mechanism attached to the headlights for simultaneously and equally deflecting them at downward angles of inclination, and means for automatically restoring the headlights to normal positions when released.

13. The combination with headlight supporting arms, of supplemental sockets rearwardly fitted on said arms, headlights having sockets also removably fitted on the arms over the supplemental sockets, the adjacent extremities of the sockets having hinge connections and the upper headlight sockets forwardly tiltable on the supplemental sockets, and mechanism attached to the headlight sockets for tilting the latter and headlights.

14. The combination with headlight supporting arms, of supplemental sockets rearwardly fitted on said arms, headlights having sockets also removably fitted on the arms over the supplemental sockets, the adjacent extremities of the sockets having hinge connections and the upper headlight sockets forwardly tiltable on the supplemental sockets, and mechanism attached to and coöperating with the headlight sockets for simultaneously and equally tilting the latter sockets and headlights.

15. The combination with headlight supporting means, of lower supplemental sockets removably and adjustably fitted on said means, headlights having sockets removably and adjustably fitted on said means over the supplemental sockets, the adjacent extremities of the headlight and lower sockets having hinge connections to render the headlight sockets forwardly tiltable on the supplemental sockets, mechanism attached to the upper sockets for tilting the latter and the headlights, and spring devices coöperating with the headlight sockets for restoring the headlights and the said mechanism to normal position when released.

16. An attachment for a lighting device of the class specified, consisting of a support engaging socket member removably fitted on and also adapted to have a fixed position of application relatively to the support, a socket member for engaging the lighting device and removably fitted on the support engaging socket member, and a hinge connection between the members whereby the member for the light engaging device may have a free tilting movement relatively to the support engaging member.

17. An attachment for a lighting device of the class specified, consisting of a support engaging socket member removably fitted on and also adapted to have a fixed position of application on a support, a socket member for engaging a lighting device, and a horizontally disposed hinge connection between the members whereby the member for engaging the lighting device may be freely tilted on the support engaging member.

18. An attachment for a lighting device of the class specified, consisting of a support engaging socket member removably mounted on and also adapted to have a fixed position of application on a support, a socket member for engaging a lighting device, an automatically operating hinge connection between the contiguous ends of the members, and means for freely tilting the lighting device engaging member relatively to the support engaging member.

19. An attachment for a lighting device of the class specified, consisting of a support engaging socket member removably and adjustably mounted and also adapted to have a fixed position of application on a support, a socket member for engaging a lighting device, an automatically operating hinge connection between the members and permitting the lighting device engaging member to freely move on the support engaging member, the lighting device engaging member having an arm attached thereto, a rod connected to the said arm, and means for imparting movement to the rod.

In testimony whereof I have hereunto set my hand in presence of two subscribing witnesses.

WILLIAM N. ALLAN.

Witnesses:
WM. D. POULTNEY,
THOMAS B. MARSHALL.